United States Patent [19]

Nakamura

[11] Patent Number: 4,654,777

[45] Date of Patent: Mar. 31, 1987

[54] SEGMENTED ONE AND TWO LEVEL PAGING ADDRESS TRANSLATION SYSTEM

[75] Inventor: Hiroshi Nakamura, Tokorozawa, Japan

[73] Assignee: Tokyo Shibaura Denki Kabushiki Kaisha, Kawasaki, Japan

[21] Appl. No.: 495,615

[22] Filed: May 18, 1983

[30] Foreign Application Priority Data

May 25, 1982 [JP] Japan ............................ 57-88571
May 25, 1982 [JP] Japan ............................ 57-88572

[51] Int. Cl.$^4$ ............................................ G06F 12/10
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,764,996 | 10/1973 | Ross | 364/200 |
| 4,128,875 | 12/1978 | Thurber et al. | 364/200 |
| 4,155,119 | 5/1979 | De Ward et al. | 364/200 |
| 4,356,549 | 10/1982 | Chueh | 364/200 |
| 4,376,297 | 3/1983 | Anderson et al. | 364/200 |
| 4,386,399 | 5/1983 | Rasala et al. | 364/200 |
| 4,569,018 | 2/1986 | Hummel et al. | 364/200 |

Primary Examiner—James D. Thomas
Assistant Examiner—C. H. Lynt
Attorney, Agent, or Firm—Cushman, Darby & Cushman

[57] ABSTRACT

An address translation system is provided which has a real storage, a virtual storage having a "V=R" segment (first segment), second segments to be subjected to two-level paging, and page table segments (third segments) to be used as a page table corresponding to the second segments, a segment table, a first page table which corresponds to the second segments, a second page table which corresponds to the page table segments, and a memory control unit having a virtual address register and a microprocessor for translating the virtual address in the virtual address register into a real address. By means of microprogram control, the microprocessor has a first address translation function for obtaining a real address from the page number and the displacement data of the virtual address if the segment number of the virtual address represents the first segment, a segment table referring function for referring to the segment table based on the segment number if the segment number does not represent the first segment, and a second address translation function for referring to the second page table based on the reference result from the segment table and the several most significant bits of the page number, for referring to the first page table based on the reference result of the second page table and on the remaining bits of the page number, and for obtaining the real address from the reference result of the first page table and the displacement data.

4 Claims, 17 Drawing Figures

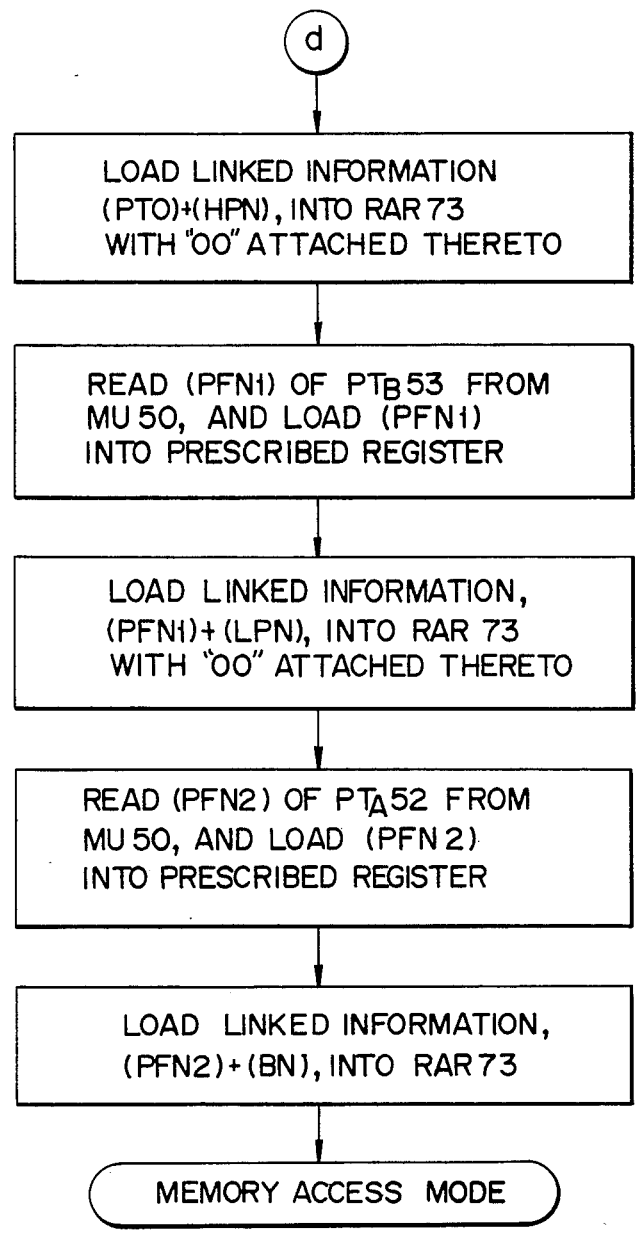

SEGMENTED ONE AND TWO LEVEL PAGING ADDRESS TRANSLATION SYSTEM

BACKGROUND OF THE INVENTION

The present invention relates to a virtual storage system for handling a virtual address consisting of a segment number, a page number and displacement data (byte number) and, more particularly, to an address translation system for translating a virtual address into a real address.

A conventional virtual storage system of this type generally has a configuration as shown in FIG. 1. In the system shown in FIG. 1, in order to access a memory unit (to be referred to as an MU hereinafter) 3, processors (to be referred to as Ps hereinafter) 1 and input/output channels (to be referred to as CHs hereinafter) 2 transmit real addresses onto a system bus 4. For this purpose, each of the Ps 1 and CHs 2 has an address translation section (to be referred to as an ATS hereinafter) 5 which translates a virtual address into a real address. The real address on the system bus 4 is supplied to the MU 3 through a memory control unit (to be referred to as an MCU hereinafter) 6.

In the conventional virtual storage system of this type, since each processor and each channel has an ATS, the overall system becomes costly.

In order to solve this problem, a virtual storage system as shown in FIG. 2 has also been proposed. In the system shown in FIG. 2, in order to access an MU 13, Ps 11 and CHs 12 transmit virtual addresses onto a system bus 14. Therefore, the Ps 11 and CHs 12 do not each need to have an ATS. As is well known, a real address is required to access the MU 13. In the system shown in FIG. 2, an MCU 16 has an ATS 15 which translates a virtual address on the system bus 14 into a real address. A paging unit 18 is connected to the MCU 16.

In the conventional virtual storage system shown in FIG. 1, the virtual addresses are not assigned in one-to-one correspondence to all the information (all real addresses) stored in the MU 3. For example, the page table is stored only in the MU 3, that is, in a real storage, and a virtual address is not assigned to the page table. Furthermore, in the system shown in FIG. 1, the Ps 1 and CHs 2 handle both virtual and real addresses. For this reason, the Ps 1 can access (cache access) a cache memory (to be referred to as a CACHE hereinafter) 7 using a real address. Thus, even if a virtual address is not assigned to the page table, the Ps 1 can cache access a page table entry without any problem.

In contrast to this, in the virtual storage system shown in FIG. 2, the Ps 1 and CHs 2 handle only virtual addresses. For this reason, the P 11 must cache access the CACHE 17 using a virtual address. If a virtual address is not assigned to the page table in the same manner as in the system shown in FIG. 1, the Ps 11 cannot cache access the page table entry.

In order to allow a P 11 to cache access a table entry, a virtual address may be assigned to the page table. In order to assign a virtual address to the page table, the page table may be stored in a segment (first segment), i.e., a "V=R" segment, in which the virtual address coincides with the real address in a virtual address space (or a virtual storage) which is divided in units of segments.

However, the size (segment size) of the "V=R" segment is predetermined for each system. Therefore, if the number of pages constituting a segment is large, and the number of segments is also large, the page table cannot be stored within the "V=R" segment. Therefore, in the system shown in FIG. 2, it becomes difficult to support a large virtual address space.

SUMMARY OF THE INVENTION

It is an object of the present invention to provide an address translation system which realizes a virtual storage system capable of translating a virtual address into a real address at the side of a memory control unit.

It is another object of the present invention to provide an address translation system which is capable of supporting a large virtual address space.

In order to achieve the above and other objects of the present invention, there is provided an address translation system which has a virtual storage, a real storage, and a memory control unit. The virtual storage includes a first segment, a group of second segments, and a group of third segments. Each of these segments is formed of a block having the same number of pages. An address in the virtual storage is designated by a virtual address, and this virtual address includes a segment number that specifies one of the segments, a page number specifying a page within the segment, and a displacement data which specifies an offset from the beginning of the page specified by the page number. The segment number of the first segment in the virtual storage is zero, and the segment numbers of the second and third segment groups are either even and odd, respectively, or odd and even, respectively.

The real storage is formed of a plurality of page frames, each of these page frames having the same size as the pages. The real storage has a first region in which information corresponding to the first segment of the virtual storage is permanently assigned. Pages of the second and third segments can be selectively stored in a second region of the real storage. Within the first region of the real storage, the addresses are specified by a real address which is equivalent to a virtual address that has a segment number of zero.

A first page table is provided for each of the second segments, and is stored in both the second region of the real storage, and in $2^M$ pages of the third segments. The location in the third segments where this $2^M$ pages is stored in one in which a segment number differs from the segment number of the second segment by one in a predetermined direction, that is $\pm 1$. Each of these first page tables has a number of entries, which number is equivalent to the number of pages in the second segment to which it corresponds. Each of these page tables also includes a first page frame number which specifies a page frame of the real storage to which the page specified by the page number of a virtual address is assigned.

A second page table is also provided for the first page table and has a number of entries, which number is equal to the number of pages that the first page table occupies. Each second page table has a second page frame number which specifies the page frame of the real storage in which the first page table to which the second page table is associated is stored. The second page tables are stored in the first segment of virtual storage and in the first region of the real storage.

This first segment of virtual storage and the first region of real storage also includes a segment table which has a plurality of entries. One of these entries is designated by the segment number of a virtual address, and these entries also include translation type data which specifies address translation type, and origin data which specifies an origin of the second page table.

The memory control unit includes a number of substructures. A register is provided which stores a virtual address. Segment discrimination means determines whether the segment number of the virtual address specifies the first, second or third segments. When the virtual address specifies the first segment, it is treated as a real address. When the segment number specifies one of the second segments, the entries of the segment table which is specified by this segment number is determined. If the translation data then indicates two level paging translation, the second page frame number is determined. The first page table entries are determined from the second page frame number, and a real address is determined from the information from the first page frame concatenated with the displacement data.

BRIEF DESCRIPTION OF THE DRAWINGS

FIGS. 13A to 13E are flowcharts for address translation processing by microprogram control.

DETAILED DESCRIPTION OF THE PREFERRED EMBODIMENTS

Figure 1:
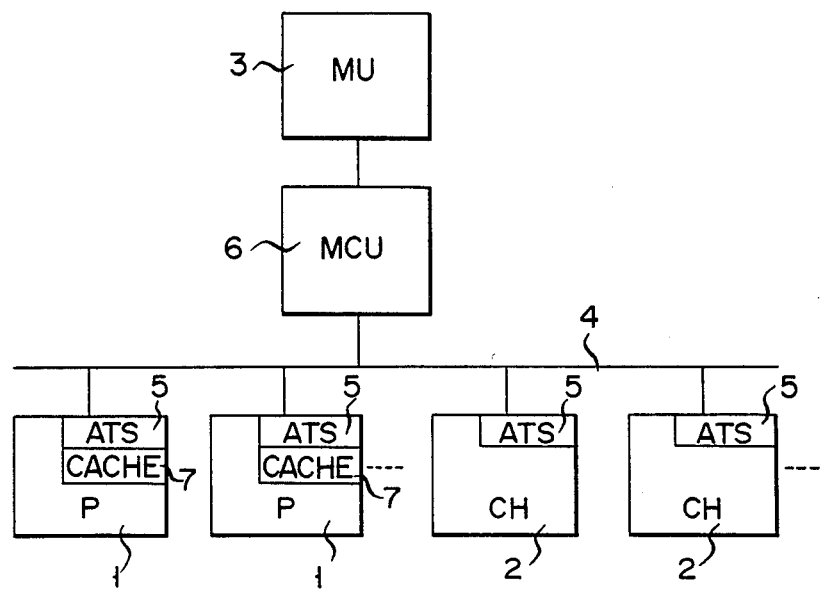
FIG. 1 is a block diagram showing the configuration of a conventional virtual storage system.
Figure 2:
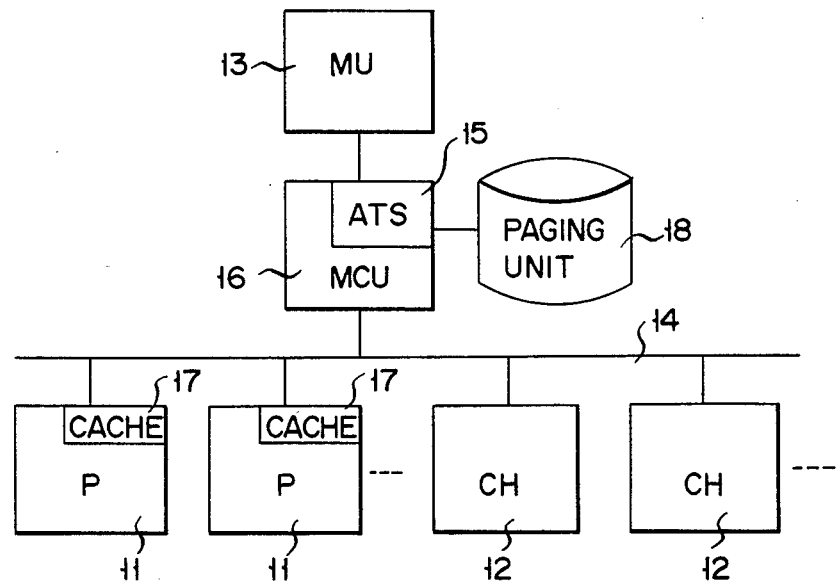
FIG. 2 is a block diagram showing the configuration of another conventional virtual storage system which is proposed to solve the problem of the system shown in FIG. 1.
Figure 3:
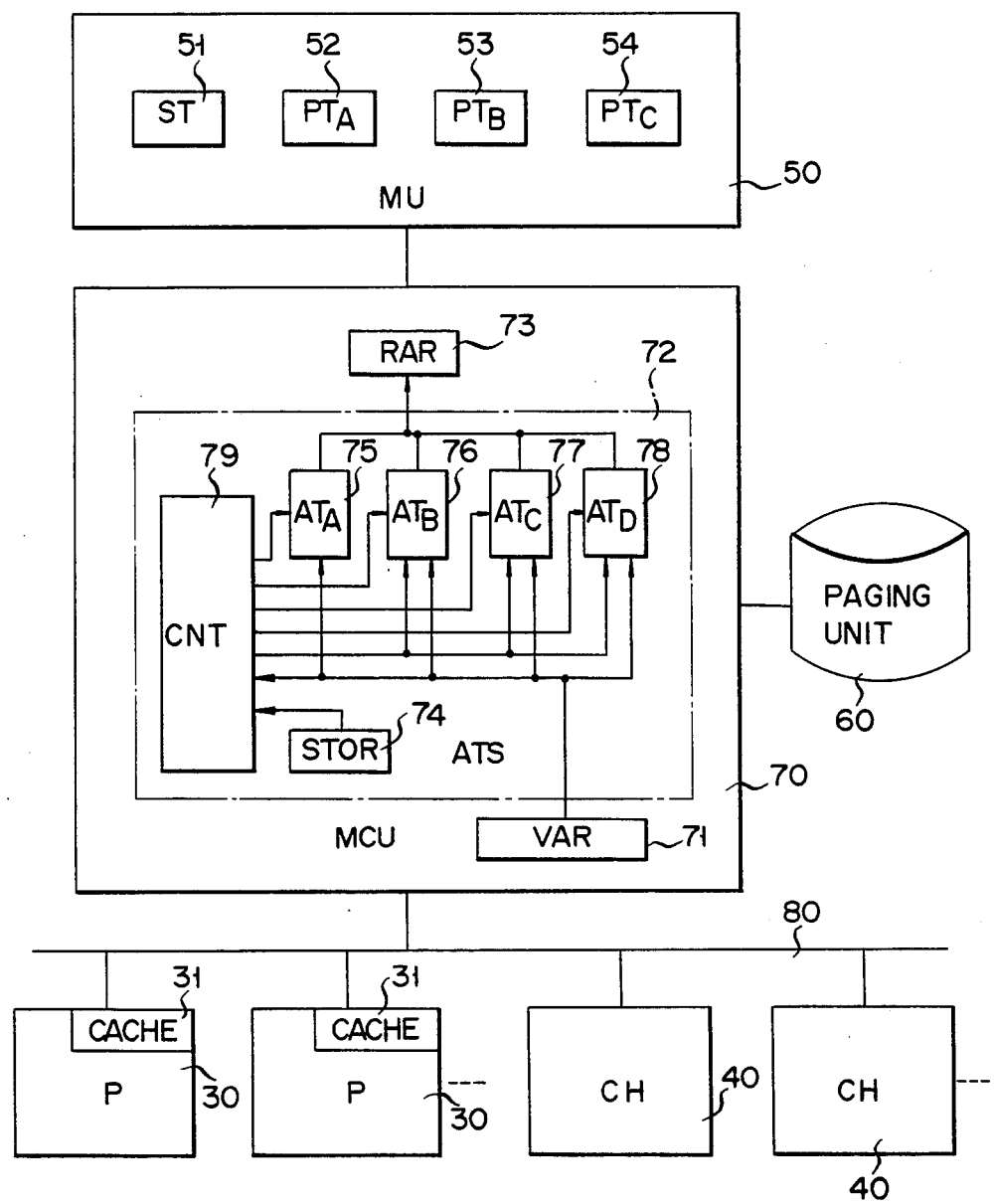
FIG. 3 is a block diagram showing the configuration of a virtual storage system according to an embodiment of the present invention.

FIG. 3 is a block diagram of a virtual storage system according to an embodiment of the present invention. The virtual storage system has processors (to be referred to as Ps hereinafter) 30, input/output channels (to be referred to as CHs hereinafter) 40, a memory unit (to be referred to as an MU hereinafter) 50, a paging unit 60, a memory control unit (to be referred to as an MCU hereinafter) 70, and a system bus 80. Thus, at first glance, the system of this embodiment resembles the system shown in FIG. 2. However, the system of this embodiment differs significantly from the conventional system shown in FIG. 2, as will be made clear from the following description.

Each P 30 has a cache memory (to be referred to as a CACHE hereinafter) 31. The Ps 30 and the CHs 40 do not have any address translation function for translating a virtual address VA into a real address RA. Thus, the Ps 30 and the CHs 40 can handle only virtual addresses VA.

Figure 4:
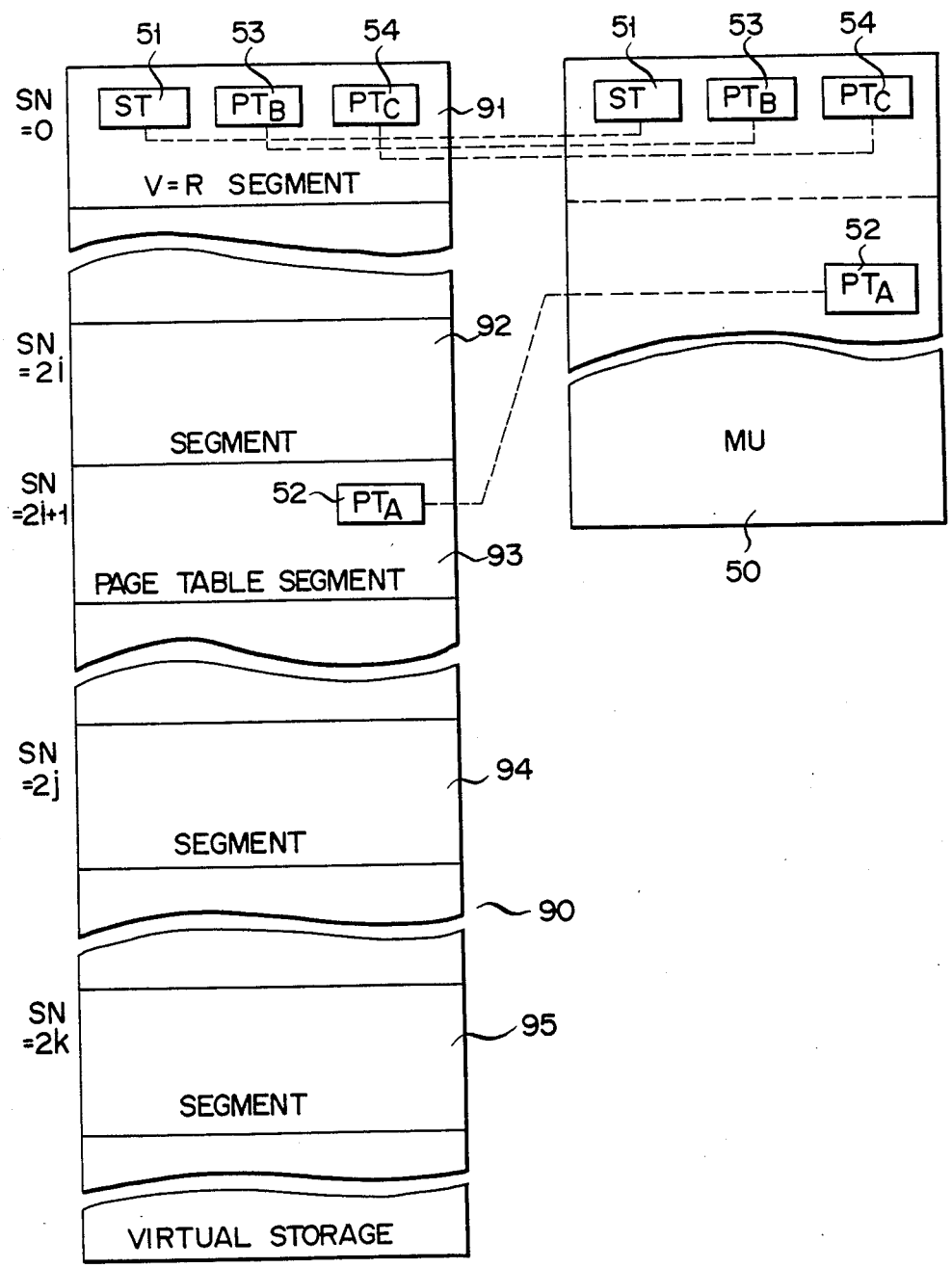
FIG. 4 shows various segments of a virtual storage and the positional relationship between the various page tables in a virtual storage and the various page tables in a memory unit (real storage)

The MU 50 has a segment table (to be referred to as an ST hereinafter) 51, a first page table (to be referred to as a $PT_A$ hereinafter) 52, a second page table (to be referred to as a $PT_B$ hereinafter) 53, and a third page table (to be referred to as a $PT_C$ hereinafter) 54. A similar set of an ST 51, a $PT_A$ 52, a $PT_B$ 53, and a $PT_C$ 54 is also arranged in a virtual storage 90, as shown in FIG. 4. The virtual storage 90 is controlled as divided in units of segments. Each segment is further divided in units of pages. A virtual address VA is a logic address which represents an address location of the virtual storage 90.

Figure 5:
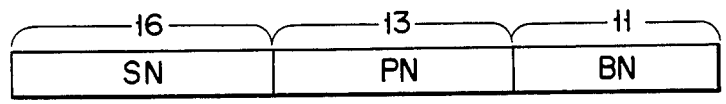
FIG. 5 shows the format of a virtual address.
Figure 6:
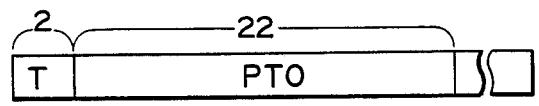
FIG. 6 shows the format of a segment descriptor.

The virtual address VA consists of a segment number SN (16 bits), a page number PN (13 bits) and displacement data BN (11 bits), as shown in FIG. 5. The segment number SN represents a segment in the virtual storage 90. The page number PN represents a page in the segment. The displacement data BN represents displacement in the page by a byte number. As is well known, the virtual address VA whose segment number SN is 0 (decimal notation) coincides with a real address RA.

Referring to FIG. 4 again, the ST 51, the $PT_B$ 53 and the $PT_C$ 54 are located in a segment (first segment) in the virtual storage 90 which has a segment number SN of 0, that is, a "V=R" segment 91. The ST 51, the $PT_B$ 53 and the $PT_C$ 54 are also located in an area of the MU 50 (i.e., a real storage) which corresponds to the "V=R" segment 91. If the ST 51, the $PT_B$ 53, and the $PT_C$ 54 are stored in the "V=R" segment 91 in the virtual storage 90, virtual addresses VA are assigned to the respective entries of the ST 51, the $PT_B$ 53 and the $PT_C$ 54 of the MU 50 (real storage) in one-to-one correspondence.

In this embodiment, each segment of the virtual storage 90 has, in addition to the "V=R" segment 91, a group of segments (second segments) 92 which are subjected to two-level paging, a group of page table segments (third segments) 93 which are used as the $PT_A$ 52 corresponding to the segments 92, a group of segments (fourth segments) 94 to be relocated, and a group of segments (fifth segments) 95 which are subjected to one-level paging. The segment number SN of the segments 92 is 2i (where i is a positive integer), and the segment number SN of the page table segments 93 is 2i+1. The segment numbers SN of the segments 94 and 95 are respectively 2j (where j is a positive integer; j≠i) and 2k (where k is a positive integer; k≠i, j). In this embodiment, segments which have segment numbers of 2j+1 and 2k+1 are not used. The $PT_A$ 52 is a page table corresponding to the segments 92. The $PT_A$ 52 is stored in the page table segments 93. The $PT_B$ 53 is a page table corresponding to the page table segments 93, and the $PT_C$ 54 is a page table corresponding to the segments 95. The $PT_A$ 52 is stored in an area of the MU 50 (i.e., the real storage) which corresponds to the page table segments 93.

Referring to FIG. 3 again, the MCU 70 has a virtual address register (to be referred to as a VAR hereinafter) 71 holding the virtual address VA, an address translation section (to be referred to as an ATS hereinafter) 72 for translating a virtual address VA into a real address RA, and a real address register (to be referred to as an RAR hereinafter) 73 for holding the real address RA. The ATS 72 has a segment table origin address register (to be referred to as an STOR hereinafter) 74 for holding an origin address of the ST 51 stored in the MU 50 (real storage), a first address translator (to be referred to as an $AT_A$ hereinafter) 75, a second address translator (to be referred to as an $AT_B$ hereinafter) 76, a third address translator (to be referred to as an $AT_C$ hereinafter) 77, a fourth address translator (to be referred to as an $AT_D$ hereinafter) 78, and a controller (to be referred to as a CNT hereinafter) 79. The $AT_A$ 75, the $AT_B$ 76, the $AT_C$ 77, and the $AT_D$ 78 have a function of translating a virtual address VA into a real address RA, and are selectively operated by the CNT 79.

Assume that a memory read access is to be performed by a P 30. In this case, the P 30 accesses the CACHE 31 using a virtual address VA. If the desired data is not present in the CACHE 31, that is, in the case of a cache error, a virtual address VA is supplied from the P 30 onto the system bus 80. In the case of a memory write access, a virtual address VA is also supplied from the P 30 onto the system bus 80. The virtual address VA on the system bus 80 is supplied to the MCU 70. The MCU 70 allows the ATS 72 to perform address translation. As a result, the virtual address VA is translated into a corresponding real address RA. Using this real address RA, the MCU 70 accesses the MU 50 and reads out the desired data from the MU 50. The readout data is transferred to the P 30 through the system bus 80. In the case of the memory write access, the MCU 70 writes the data in the MU 50. The above operation is almost the same in the case where the CH 40 must perform a memory access. However, since the CH 40 does not have a cache memory, it does not perform a cache access. When a memory write access is made in response to a request from the P 30 or the CH 40, the data in the CACHE 31 is updated if the data at the address of the MU 50 corresponding to the virtual address VA which corresponds to the write data is present in the CACHE 31.

Address translation by the ATS 72 in the MCU 70 will now be described. The CNT 79 in the ATS 72 has a microprogram memory (not shown) and controls the $AT_A$ 75, the $AT_B$ 76, the $AT_C$ 77, the $AT_D$ 78 and the like by microprogram control. The CNT 79 checks whether or not the segment number SN in the virtual address VA loaded in the VAR 71 is 0 (all "0" for 16 bits).

If the segment number SN is 0, that is, if the segment number SN indicates the "V=R" segment 91, the CNT 79 starts the $AT_A$ 75. As may be seen from the above description, in the "V=R" segment 91, the virtual address VA coincides with the real address RA. In this embodiment, the virtual address VA representing an address position of the "V=R" segment 91 consists of a segment number SN (all "0" for 16 bits) and a 24-bit relative address in the segment (a 13-bit page number PN and an 11-bit byte number BN). The 24-bit relative address represents the real address RA. A real address RA used in this embodiment has 32 bits. Therefore, when the $AT_A$ 75 is started by the CNT 79, the $AT_A$ 75 produces as a real address RA 32 least significant bits of the 40-bit virtual address VA stored in the VAR 71. This address translation by the $AT_A$ 75 is called "V=R" address translation (first address translation). The real address RA produced from the $AT_A$ 75 is loaded in the RAR 73.

On the other hand, if the segment number SN is not all "0", that is, if the segment number SN indicates a segment other than the "V=R" segment 91, the CNT 79 obtains a real address based on the segment number SN and the contents of the STOR 74 (a segment table origin address). The real address RA thus obtained indicates a specific entry location of the ST 51 in the MU 50. The real address RA is obtained by, for example, adding the segment number SN and the contents of the STOR 74, that is, ((STOR)+(SN)). The CNT 79 reads out from the MU 50 the contents at the entry number in the ST 51 which are specified by the thus-obtained real address RA.

The contents, that is, the segment descriptor of each entry (segment table entry) of the ST 51 consist of 2-bit translation type specifying data (to be referred to as a translation type number hereinafter) T, and a 22-bit page table origin address PTO. The translation type number T comprises three types: T=0, 1, and 2 (decimal notation). The translation type number T indicates the type of address translation. T=0 indicates relocation address translation, T=1 indicates one level paging address translation, and T=2 indicates two level paging address translation. T=2 is preset in the entry of the ST 51 which corresponds to the segment 92. Similarly, T=0 is preset in the entry of the ST 51 which corresponds to the segment 94 and T=1 is preset in the entry of the ST 51 which corresponds to the segment 95. In this embodiment, entries corresponding to the odd-numbered segments such as the page table segments 93 are not present in the ST 51. The PTO represents the origin address of the corresponding page table in the MU 50. In the ST 51, origin data ORIGIN (MSB="0") is preset in the entry corresponding to the segment 94 in place of the PTO. The ORIGIN is the page frame number of the origin page of the corresponding segment in the MU 50 (real storage).

The CNT 79 reads out the contents of the corresponding entry of the ST 51. If the translation type number T of the corresponding entry is 0, the CNT 79 starts the $AT_B$ 76. If T is 1, the CNT 79 starts the $AT_C$ 77. If T is 2, the CNT 79 starts the $AT_D$ 78.

Figure 7:
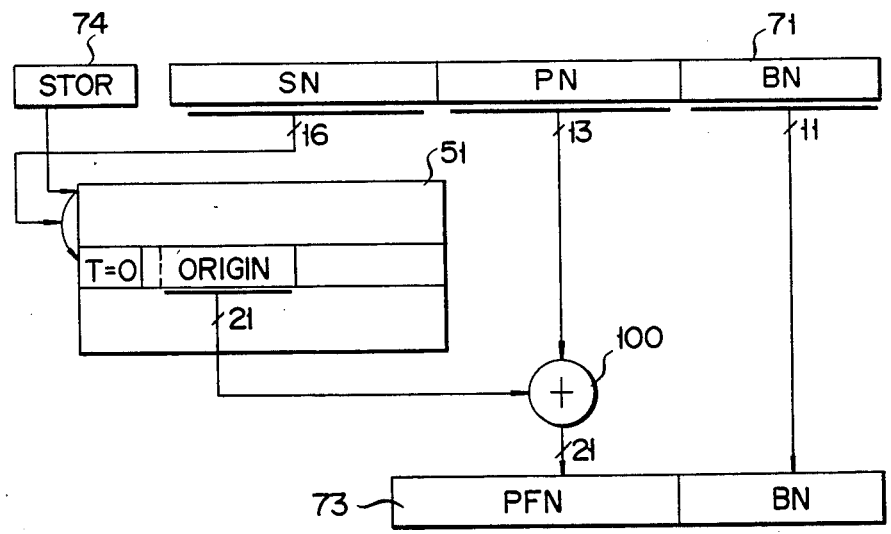
FIG. 7 is for explaining the relocation address translation function.

The address translation processing in the case where the $AT_B$ 76 is started will first be described with reference to FIG. 7. FIG. 7 mainly shows the address translation function by the $AT_B$ 76 and the CNT 79. As has been described earlier, based on the segment number SN of the virtual address VA stored in the VAR 71 and on the contents of the STOR 74, the contents (segment descriptor) of the corresponding entry of the ST 51 are read out from the MU 50. When the translation type number T of the descriptor is detected as 0, the $AT_B$ 76 is selected by the CNT 79. At this time, the origin data ORIGIN (21 least significant bits) of the segment descriptor are supplied to an adder 100 in the $AT_B$ 76. The page number PN of the virtual address VA is also supplied to the adder 100. The adder 100 thus adds the ORIGIN and PN ((ORIGIN)+(PN)), and produces a page frame number PFN. The $AT_B$ 76 concatenates the page frame number PFN (21 bits) and the byte number BN (11 bits) of the virtual address VA and loads an obtained real address RA (32 bits) in the RAR 73. This address translation function is called relocation address translation (third address translation).

Figure 8:
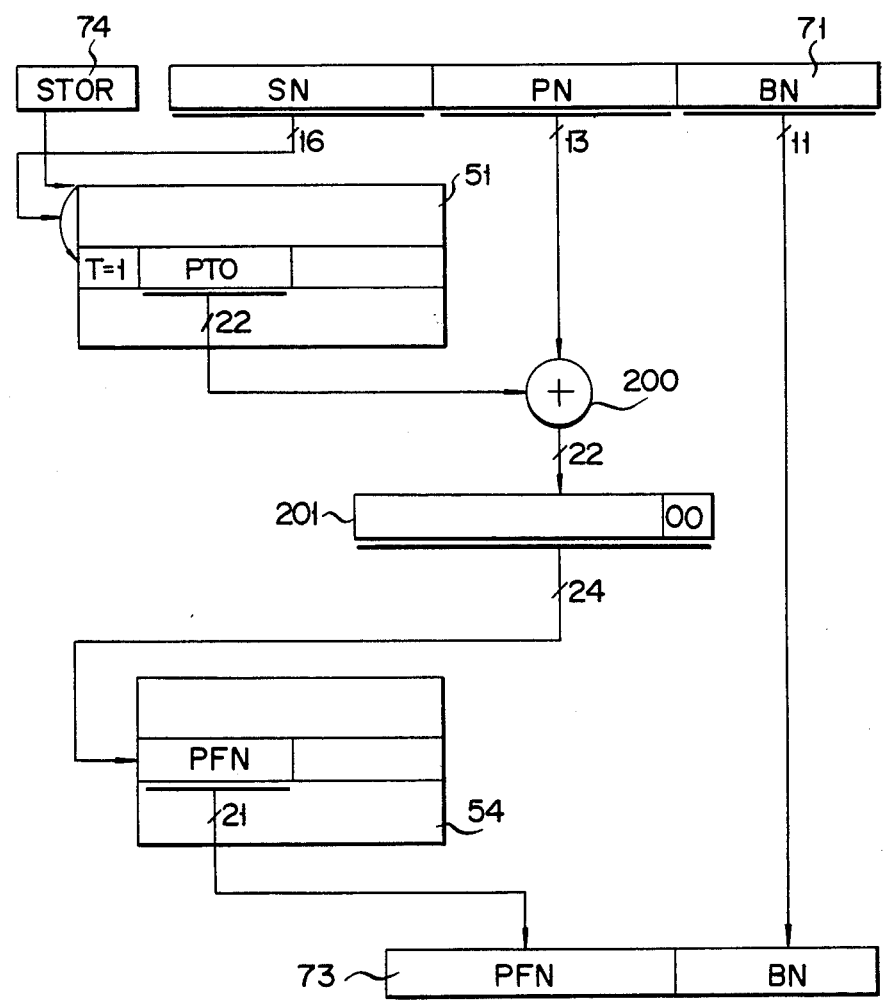
FIG. 8 is for explaining the one level paging address translation function.

The address translation operation in the case where the $AT_C$ 77 is started will now be described with reference to FIG. 8. FIG. 8 mainly shows the address translation function by the $AT_C$ 77 and the CNT 79. If the segment number SN of the virtual address VA loaded in the VAR 71 indicates the segment 95, the translation type number T in the segment descriptor as the entry contents of the ST 51 is 1. Therefore, the $AT_C$ 77 is selected by the CNT 79. Then, the page table origin address PTO in the segment descriptor is supplied to an adder 200 in the $AT_C$ 77. The adder 200 also receives the page number PN of the virtual address VA. The adder 200 adds the PTO and PN as ((PTO)+(PN)). The summation result (22 bits) from the adder 200 is loaded into the region of the 22 most significant bits of a 24-bit register 201. Data "b 00" is loaded into the region of the 2 least significant bits of the register 201. Therefore, the contents of the register 201 are four times the summation result. In this embodiment, the summation result from the adder 200 is multiplied by 4 since the entry size of the $PT_C$ 54 is 4 bytes. This also applies to the $PT_A$ 52 and the $PT_B$ 53. The page table origin address PTO in the segment descriptor in which T=1 is preset indicates the origin address of the $PT_C$ 54 in the MU 50. Therefore, a value obtained by multiplying the summation result of PTO and PN by 4 (that is, the contents of the register 201) indicates a real address $RA_o$ (=virtual address $VA_o$) which indicates the start location of the desired entry in the $PT_C$ 54.

In the entry of the $PT_C$ 54 which is specified by the register 201, the page frame number PFN (21 bits) of the desired page is set. Using the real address $RA_o$ loaded in the register 201, the $AT_C$ 77 reads out the contents from the corresponding entry of the $PT_C$ 54 so as to obtain the page frame number PFN of the desired page. The $AT_C$ 77 concatenates this page frame number PFN (21 bits) and the byte number BN (11 bits) in the virtual address VA, and loads an obtained real address RA (32 bits) into the RAR 73. This address translation is called one-level paging address translation (fourth address translation).

Figure 9:
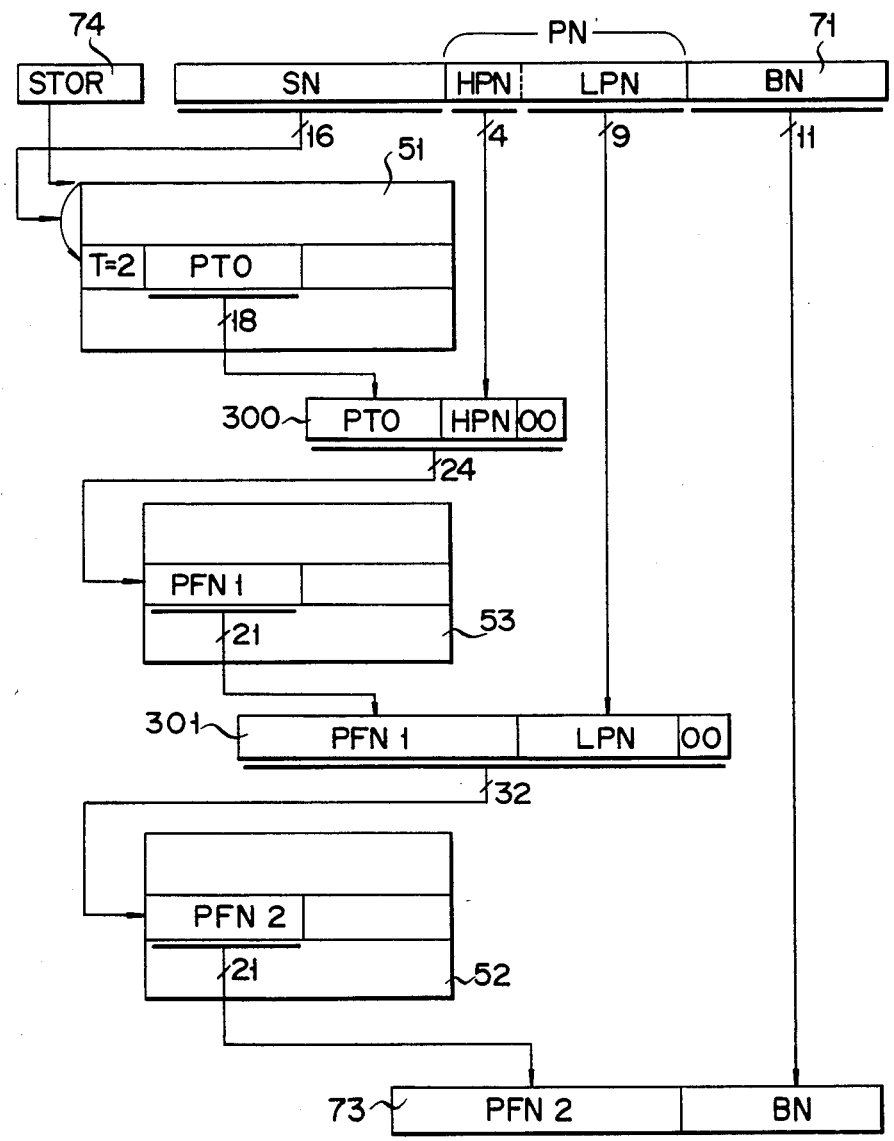
FIG. 9 is for explaining the two level paging address translation function.

The address translation operation in the case where the $AT_D$ 78 is started will now be described with reference to FIG. 9. FIG. 9 mainly shows the address translation function by the $AT_D$ 78 and the CNT 79. If the segment number SN of the virtual address VA in the VAR 71 indicates the segment 92, the translation type number T in the segment descriptor as the entry contents of the ST 51 is 2. Therefore, the $AT_D$ 78 is started by the CNT 79. The page table origin address PTO (22 bits) of the segment descriptor in which T=2 is preset specifies the origin address of the $PT_B$ 53 in the MU 50 in units of 64 bytes. In the PTO, the 18 most significant bits are effective, and the 4 least significant bits are, for example, all "0". The 18 most significant bits of the PTO are loaded into the region of the 18 most significant bits of a 24-bit register 300. The 4 most significant bits (HPN) of the 13-bit page number PN in the virtual address are loaded into the region of the 4 subsequent bits of the register 300. Data "00" is loaded into the region of the 2 least significant bits of the register 300. The contents of the register 300, that is, the concatenation result of the PTO, HPN and "00", indicates the real address $RA_o$ (=virtual address $VA_o$) representing the start location of the desired entry of the $PT_B$ 53.

At the entry of the $PT_B$ 53 which is specified by the register 300, a page frame number PFN1 (21 bits) at which the page table ($PT_A$ 52) corresponds to the desired segment (segment 92) is preset. Using the real address $RA_o$ held in the register 300, the $AT_D$ 78 reads out the contents at the corresponding entry in the $PT_B$ 53 and obtains the page frame number PFN1. The page frame number PFN1 (21 bits) is loaded into the region of the 21 most significant bits of a 32-bit register 301. The 9 least significant bits (LPN) of the page number PN (13 bits) in the virtual address VA are loaded into the region of the 9 subsequent bits of the register 301. Data "00" is loaded into the region of the 2 least significant bits of the register 301. The contents of the register 301, that is, the concatenation data of the PFN1, LPN and "00", indicate a real address $RA_1$ representing the start location of the desired entry in the $PT_A$ 52.

A page frame number PFN2 (21 bits) of the desired page is preset in the entry of the $PT_A$ 52 which is specified by the register 301. Using the real address $RA_1$ loaded in the register 301, the $AT_D$ 78 reads out the contents at the corresponding entry of the $PT_A$ 52 to obtain the page frame number PFN2. The $AT_D$ 78 concatenates the page frame number PFN2 (21 bits) and the byte number BN (11 bits) of the virtual address VA and loads an obtained real address RA (32 bits) into the RAR 73. This address translation is called two-level paging address translation (second address translation).

In this embodiment, the number of pages of a segment is $2^{13}$ since the page number PN comprises 13 bits. Therefore, the number of entries of the page table corresponding to one page is $2^{13}$. Since 4 bytes (for four addresses) are assigned to one entry of the page table in this embodiment, the table size for one segment is $2^{15}$ (bytes). In the one-level paging address translation of this embodiment in which such a page table is stored in the "V=R" segment 91 (such that a virtual address is also assigned to this page table), it becomes difficult to store the entire page table in the "V=R" segment 91. And, even if the entire page table can be stored in the "V=R" segment 91, it is difficult to store a large number of programs or the like which require "V=R" address translation capable of high-speed address translation. However, this problem is obviated in the case of relocation address translation. However, when relocation address translation is to be performed, the dynamic relocation margin is small, so that effective utilization of the real storage (MU 50) cannot be achieved.

When two-level paging address translation is to be performed, the size of the page table may be decreased as will be described below, and a large virtual address space may be supported. In this embodiment, the page table $PT_A$ 52 corresponding to the segment 92 which has a segment number SN of $2i$ is stored in the page table segment 93 which has a segment number SN of $2i+1$. The page table $PT_B$ corresponding to this page table segment 93 is stored in the "V=R" segment 91. As a result, a virtual address may be assigned to the page table, and two level paging may be performed. Since the size of one page is $2^{11}$ (bytes), the number of pages of the page table $PT_A$ 52 stored in the page table segment 93 having a segment number SN of $2i+1$ and a size of $2^{15}$ (bytes) is obtained as $2^{15}/2^{11}$ ($2^4$ pages). This means that the number of entries of the page table $PT_B$ 53 corresponding to the page table $PT_A$ 52 stored in the page table segment 93 must be $2^4$. Therefore, in this embodiment in which 4 bytes are assigned for one entry, the size of the page table $PT_B$ 53, which corresponds to the page table $PT_A$ 52 stored in the page table segment 93, is $2^6$ (bytes). This size of the page table $PT_B$ 53 is $2^6/2^{15}$ ($1/2^9$) the size of the page table $PT_C$ 54 used for one level paging. It follows from this that when two level paging is adopted, $2^9$ times the number of page tables stored in the case of one-level paging may be stored in the "V=R" segment 91. Thus, when two-level paging is adopted, a virtual storage system may be realized which has a large virtual address space consisting of a large number of segments.

In two-level paging address translation, the HPN (4 bits) of the 24-bit real address $RA_o$ (=virtual address $VA_o$) used for referring to the page table $PT_B$ 53 stored in the area of the MU 50 corresponding to the "V=R" segment 91 specifies one of the $2^4$ entries in the page table $PT_B$ 53. Therefore, there are $2^4$ types of page frame numbers PFN1 (21 bits) which are set in the entries of each page table. In these $2^4$ types of page frame numbers PFN1, the 4 least significant bits are different from each other.

The size of the page table $PT_A$ 52 which corresponds to the segment 92 having a segment number of 2i and which is stored in the segment (page table segment 93) having a segment number SN of 2i+1 is $2^{15}$ (bytes). Therefore, the number of entries of the page table $PT_A$ 52 is $2^{13}$. Data representing one of these $2^{13}$ entries is the linked information (13 bits) of the LPN (9 bits) and the 4 least significant bits of the PFN 1, the LPN and the PFN 1 being included in the 32-bit real address $RA_1$.

The real address $RA_1$ indicates the real address of the start location of the desired entry in the $PT_A$ 52 (stored in the MU 50), as described earlier. Therefore, the byte number BN of the virtual address $VA_1$ which represents the start location corresponding to the desired entry in the $PT_A$ 52 also stored in the page table segment 93 in the virtual storage 90 which has a segment number SN of 2i+1 coincides with the 9 least significant bits of the real address $RA_1$. As shown in FIG. 9, if the virtual address VA having a segment number SN of 2i consists of SN (16 bits), HPN (4 bits), LPN (9 bits) and BN (11 bits), the byte number BN in the virtual address $VA_1$ is the linked information of the LPN (9 bits) and "00", as may be apparent from the contents (real address $RA_1$) of the register 301 shown in FIG. 9.

Figure 10:
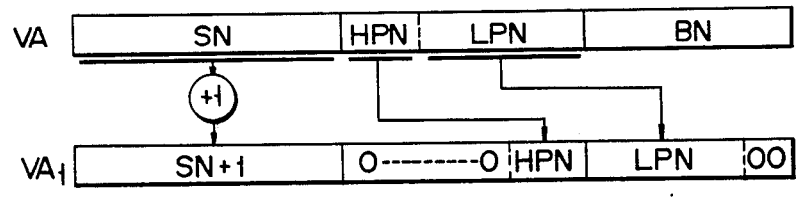
FIG. 10 shows the relationship between a virtual address in the second segment and a virtual address in the page table segment corresponding to the virtual address in the second segment.
Figure 11:
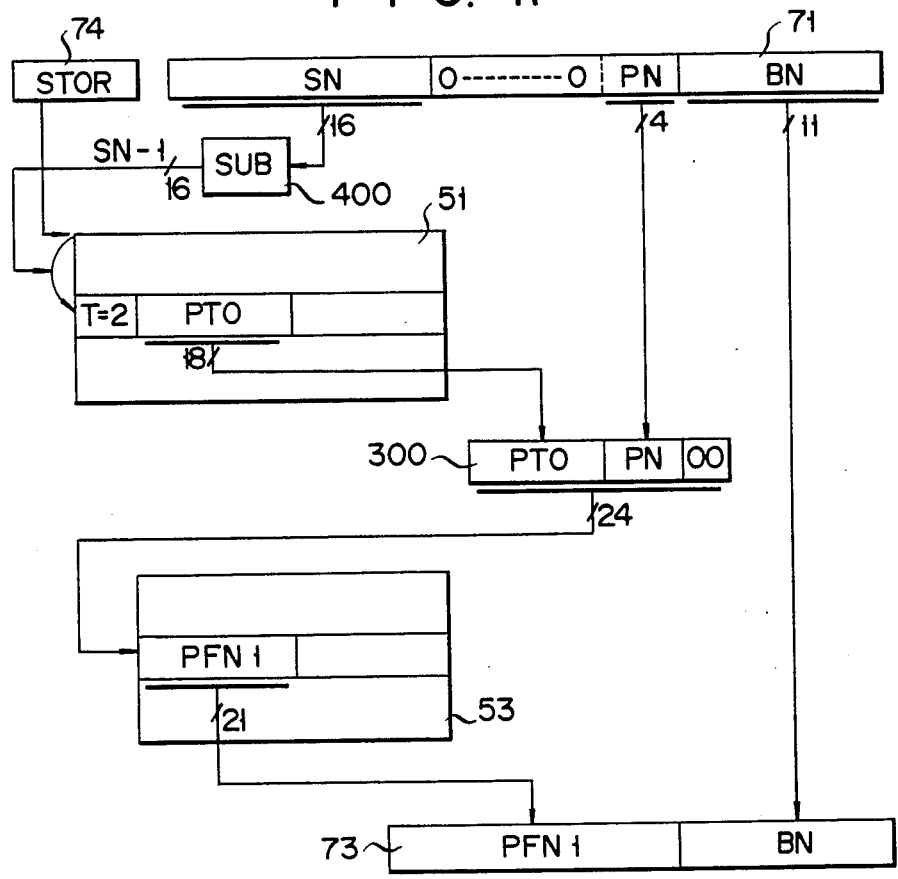
FIG. 11 is for explaining the address translation function for translating a virtual address in a page table segment into a real address.

Meanwhile, the page number PN of the virtual address $VA_1$ is HPN in the virtual address VA. This is apparent from the fact that the data representing one of the $2^4$ entries of the page table $PT_B$ 53 corresponding to the page table $PT_A$ 52 (stored in the page table segment 93 having a segment number SN of 2i+1) is the HPN (4 bits) within the 24-bit real address $RA_o$ stored in the register 300. FIG. 10 shows the relationship between the virtual address VA and the virtual address $VA_1$ described above.

As may be apparent from the above description, according to this embodiment, virtual addresses may be assigned in one-to-one correspondence to the entries of the page tables ($PT_B$ 53, $PT_C$ 54) which are stored in the area of the MU 50 which corresponds to the "V=R" segment 91, as well as to the entries of the page table ($PT_A$ 52) stored in the area of the MU 50 which corresponds to the segment other than the "V=R" segment 91 (page table segment 93). Accordingly, each P 30 can perform cache access using virtual addresses. According to this embodiment, a virtual storage system may be realized in which the MCU has an address translation function in place of the processors or input/output channels.

The address translation function for translating a virtual address $VA_1$ in the page table segment into a real address $RA_1$ will now be described. When the segment number SN of the virtual address VA loaded in the VAR 71 is not 0, the CNT 79 checks to see if this SN is an odd or even number. In the preceding description, this checking step was not described. The segment number SN of the virtual address $VA_1$ in the page table segment is 2i+1 (odd number). In this embodiment, the segment table entry of the ST 51 is present only for an even-numbered segment. Thus, in this embodiment, in order to translate the virtual address $VA_1$ in an odd-numbered segment (page table segment having a segment number SN of 2i+1), the segment table entry corresponding to the segment one segment ahead thereof is used. When the CNT 79 decides that the SN is an odd number, it subtracts 1 from the SN using a subtractor (to be referred to as an SUB hereinafter) 400. In this embodiment, the segment which is actually used among the segments which have odd segment numbers SN is a segment (page table segment) which has a segment number SN of 2i+1. Then, from the MU 50, the CNT 79 reads out the entry contents (ST 51) which correspond to the segment number SN represented by (SN−1) from the subtractor 400. T in the segment descriptor, i.e., the entry contents (ST 51), is 2, as described earlier. Therefore, the $AT_D$ 78 is started by the CNT 79.

When the $AT_D$ 78 is started, as in the case of the two-level paging address translation, the 18 most significant bits of the PTO of the segment descriptor are loaded into the region of the 18 most significant bits of the register 300. The 4 least significant bits (corresponding to the HPN in FIG. 10) of the PN of the virtual address VA (the virtual address $VA_1$ in this case) loaded in the VAR 71 are stored in the region of the 4 subsequent bits of the register 300. Data "00" is stored in the region of the 2 least significant bits of the register 300. The contents of the register 300 thus become the real address $RA_o$ (=virtual address $VA_o$) of the desired entry of the $PT_B$ 53. At the entry of the $PT_B$ 53, the page frame number PFN1 of the desired page is preset. Using the real address $RA_o$ loaded in the register 300, the $AT_D$ 78 reads out the contents from the corresponding entry of the $PT_B$ 53 so as to obtain the page frame number PFN1. The $AT_D$ 78 links the PFN1 and the BN (linked information of the LPN shown in FIG. 10 and "00") of the virtual address $VA_1$, and loads an obtained real address $RA_1$ into the RAR 73. This address translation must be performed when the $PT_A$ 52 is updated.

In the above description, the desired page is present in the real storage (MU 50). However, if the desired page is not present in the real storage, a page fault occurs, and the following operation is performed. The MCU 70 performs page-out and page-in between the MU 50 and the paging unit 60. During this time, the P 30 which has requested a memory referral interrupts the task which is currently being executed and executes another task.

Figure 12:
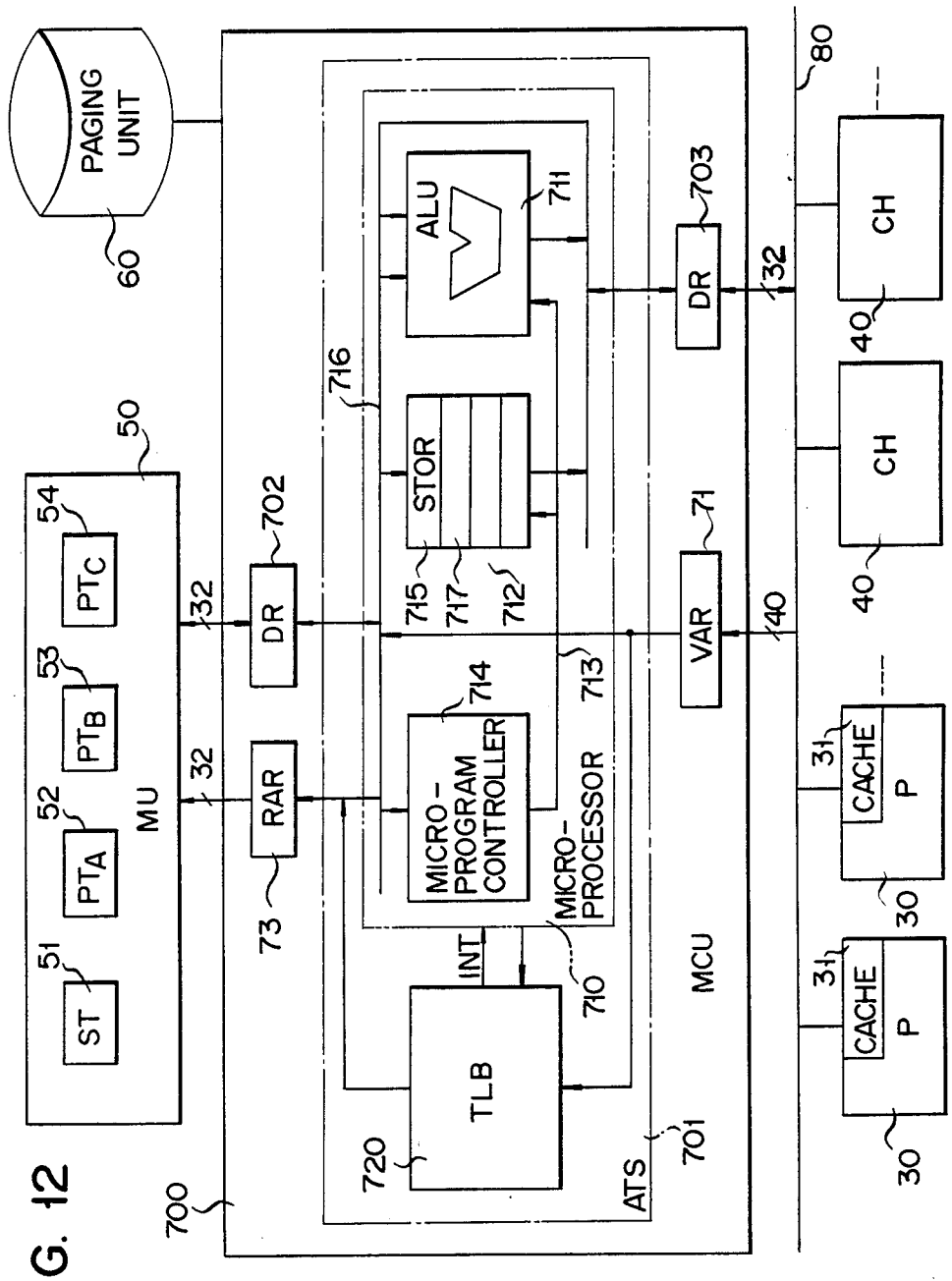
FIG. 12 is a block diagram showing a virtual storage system according to another embodiment of the present invention.

FIG. 12 shows a block diagram of a virtual storage system according to another embodiment of the present invention. The same reference numerals denote the same parts in FIG. 12 as in FIG. 3 and so a detailed description thereof will be omitted. The system shown in FIG. 12 performs an address translation operation using an arithmetic and logic unit (to be referred to as an ALU hereinafter) 711 of a microprocessor 710 in a memory control unit (to be referred to as an MCU) 700, and a register file 712. The MCU 700 has an address translation section 701 which translates a virtual address VA stored in a VAR 71 into a real address and which loads the obtained real address into an RAR 73. The ATS 701 has a microprocessor 710 and a translation look-aside buffer (to be referred to as a TLB hereinafter) 720. The virtual address VA is transmitted from a P 30 or CH 40 onto a system bus 80 and is loaded into the VAR 71. The virtual address VA is then supplied to the microprocessor 710 and the TLB 720. Then, the TLB 720 performs an address translation.

The TLB 720 has an associative register (not shown) and compares the contents at an entry of the register with the virtual address VA so as to perform high-speed address translation. When the real address RA is not obtained by the TLB 720, that is, the TLB does not hit, the TLB 720 supplies an interrupt command INT to the microprocessor 710. Then, the microprocessor 710 starts address translation.

The microprocessor 710 has a microprogram controller 714 which controls the ALU 711, the register file 712 and the like through a control bus 713. Under the control of the microprogram controller 714, "V=R38 address translation (first address translation), relocation address translation (third address translation), one-level paging address translation (fourth address translation) and two-level paging address translation (second address translation) are performed.

The address translation processing by the microprocessor 710 will now be described with reference to the flowchart shown in FIGS. 13A to 13E.

Figure 13A:
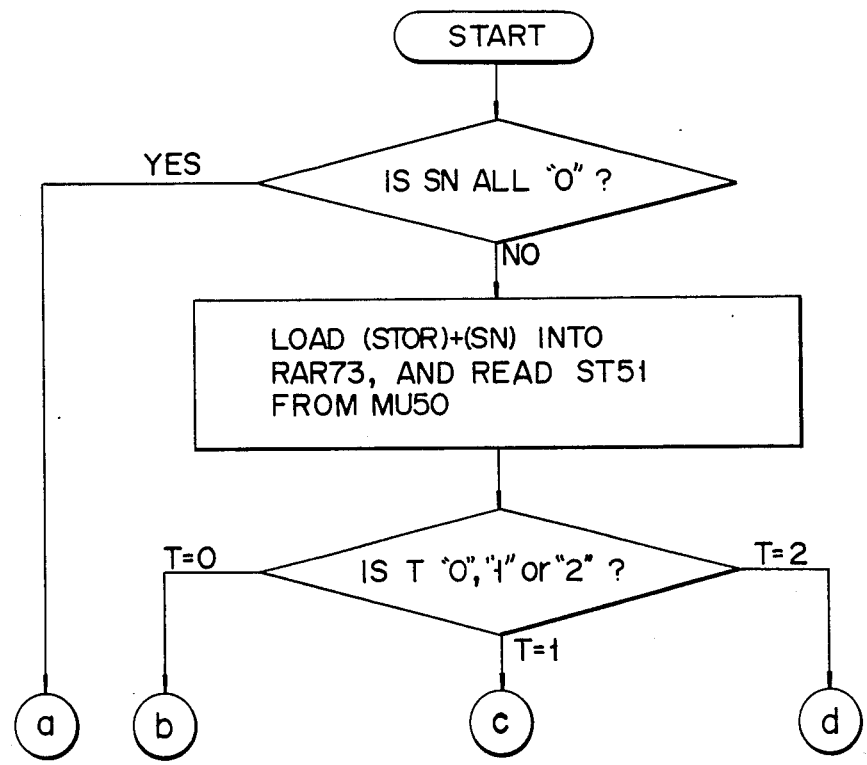

As shown in FIG. 13A, it is first determined whether or not the segment number SN of the virtual address VA loaded in the VAR 71 is all "0".

Figure 13B:
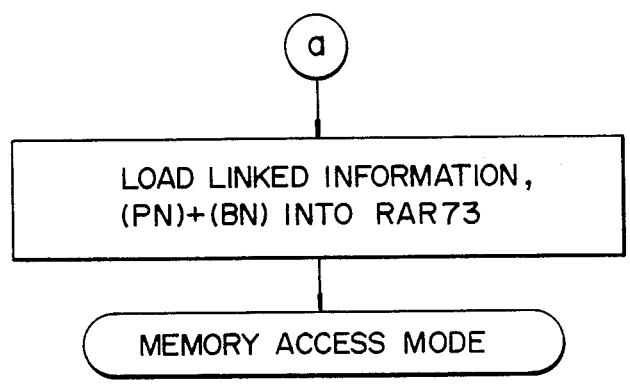

If the SN is all "0", the microprocessor 710 starts the "V=R" address translation as shown in FIG. 13B. More specifically, PN and BN in the virtual address VA are linked, and the linked information is loaded into the RAR 73 as the real address corresponding to the virtual address VA.

On the other hand, if the SN is not all "0", the corresponding real address is calculated so as to read the contents of the corresponding entry of the ST 51 from the MU 50. This may be performed by adding the segment table origin address and the segment number SN. The segment table origin address is preset in a prescribed register of the register file 712. In this embodiment, a prescribed register of the register file 712 is used as a segment table origin address register (to be referred to as an STOR hereinafter) 715. The contents of the STOR 715 and the segment number SN of the virtual address VA loaded in the VAR 71 are supplied to the ALU 711 through an internal bus 716. The ALU 711 then performs addition of the contents of the STOR 715 and the segment number SN. The summation result of the ALU 711 is loaded into the RAR 73 through the internal bus 716. The MU 50 is then accessed. Then, the data is read from the address of the MU 50 which is specified by the contents of the RAR 73. That is, the contents (segment descriptor) of the corresponding entry of the ST 51 are loaded into a data register (to be referred to as a DR hereinafter) 702. The contents of the DR 702 are loaded into a prescribed register of the register file 712, for example, a register 717, through the internal bus 716.

It is then determined whether the translation type number T in the segment descriptor loaded in the register 717 is 0, 1 or 2.

Figure 13C:
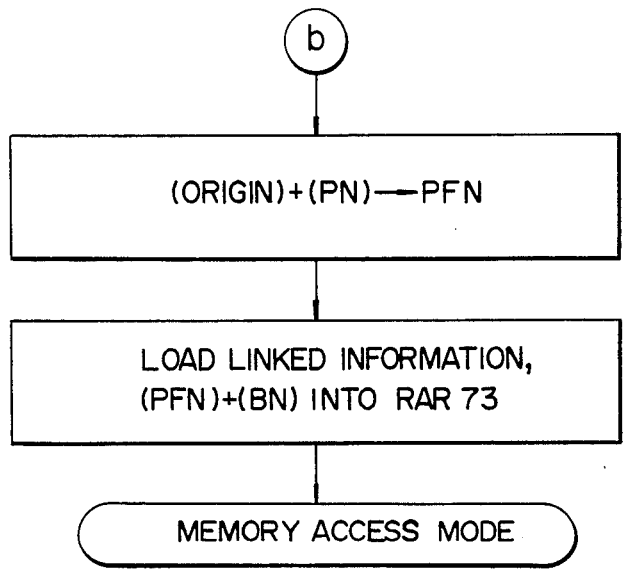

If T=0, as shown in FIG. 13C, the microprocessor 710 performs relocation address translation. First, the ORIGIN of the segment descriptor loaded in the register 717 and the PN of the virtual address VA loaded in the VAR 71 are added by the ALU 711. Then, the page frame number PFN is obtained.

Subsequently, the PFN is linked with the BN of the virtual address VA, and the linked information is loaded as a real address RA corresponding to the virtual address VA into the RAR 73.

Figure 13D:
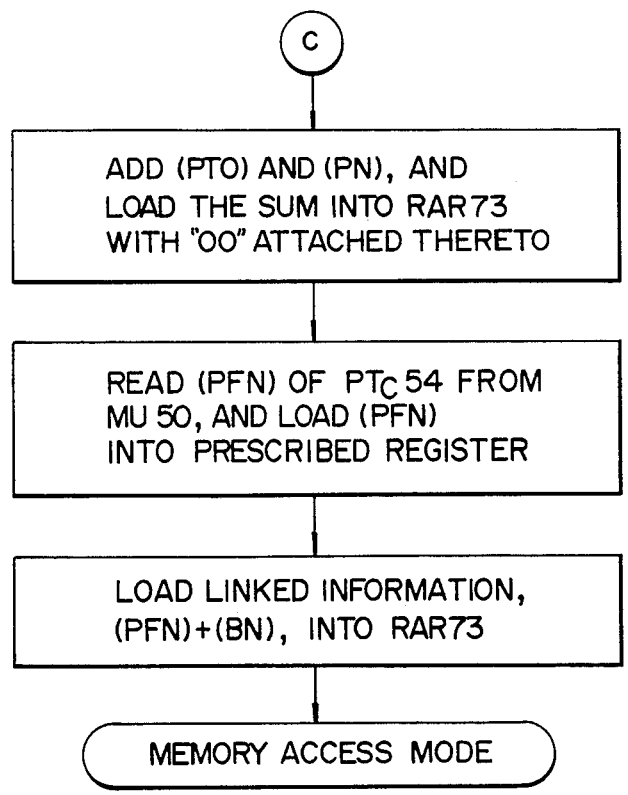

If T=1, as shown in FIG. 13D, the microprocessor 710 performs one-level paging address translation. First, the PTO of the segment descriptor loaded in the register 717 and the PN of the virtual address VA are added by the ALU 711. The data "00" is attached to the least significant bit of the sum thus obtained, thereby providing a real address $RA_o$ for reading out the contents at the corresponding entry of the $PT_C$ 54 from the MU 50. The real address $RA_o$ is loaded into the RAR 73.

Then, the MU 50 is accessed, and the data is read from the address which is specified by the contents of the RAR 73. That is, the contents at the corresponding entry of the $PT_C$ 54 are loaded into the DR 702. The contents of the DR 702 are loaded into the register 717 of the register file 712 through the internal bus 716.

The page frame number PFN of the contents in the register 717 (contents at the corresponding entry of the $PT_C$ 54) is linked with the BN of the virtual address VA. The linked information is loaded into the RAR 73 as the real address RA corresponding to the virtual address VA.

Finally, when T=2, as shown in FIG. 13E, the microprocessor 710 performs two level paging address translation. First, the PTO in the segment descriptor loaded in the register 710 is linked to the HPN of the virtual address VA. The data "00" is attached to the least significant bit of the linked information so as to provide the real address $RA_o$ for reading out the contents of the corresponding entry of the $PT_B$ from the MU 50. The real address $RA_o$ is loaded into the RAR 73.

The MU 50 is then accessed. The data is read from the address of the MU 50 which is specified by the contents of the RAR 73. That is, the contents of the corresponding entry of the $PT_B$ 53 are loaded into the DR 702. The contents of the DR 702 are loaded into the prescribed register 717 of the register file 712 through the internal bus 716.

Then, the page frame number PFN1 of the contents loaded in the register 717 (contents of the corresponding entry of the $PT_B$) is linked with the LPN of the virtual address VA. Data "00" is attached to the least significant bit of the linked information thus obtained so as to provide a real address $RA_1$ for reading out from the MU 50 the contents of the corresponding entry of the $PT_A$ 52. The real address $RA_1$ is loaded into the RAR 73.

The MU 50 is then accessed. The data is read from the address of the MU 50 which is specified by the RAR 73. That is, the contents of the corresponding entry of the $PT_A$ 52 are loaded into the DR 702. The contents of the DR 702 are loaded into the prescribed register 717 of the register file 712 through the internal bus 716.

Then, the page frame number PFN2 in the contents of the register 717 (contents of the corresponding entry of the $PT_A$ 52) is linked with the BN of the virtual address VA. The linked information is loaded into the RAR 73 as the real address RA which corresponds to the virtual address VA.

Although the present invention has been described with reference to the particular embodiments, the present invention is not limited to these. Therefore, various changes and modifications may be made within the spirit and scope of the present invention. For example, in the embodiments described above, the segment 94 to be relocated, the segment 95 to be subjected to one-level paging, and the segment 92 to be subjected to two-level paging are all even-numbered segments, while the page table segments 93 are odd-numbered segments. However, the even- and odd-numbered segments may be assigned in the opposite manner. The $PT_C$ 54, $AT_B$ 76, the $AT_C$ 77 and the like as shown in FIG. 3 may be omitted. Thus, the present invention may be applied to a virtual storage system which does not have the relocation address translation function and the one-level paging address translation function. However, in this case, the processing speed of the overall system may be lowered.

What is claimed is:

1. An address translation system comprising:
   a virtual storage having a first segment, a group of second segments and a group of third segments, each segment having the same number of pages, and an address in said virtual storage being designated by a virtual address which is formed by: (a) a segment number for specifying one of said segments, (b) a page number for specifying one of the pages in the segment specified by said segment number, and (c) displacement data for specifying an offset from the beginning of said page specified by said page number, the segment number of said first segment being zero and the segment numbers for one of said second and third segment groups being even and the segment numbers for the other of said second and third segment groups being odd;
   a real storage having a plurality of page frames, which are the same size as said pages, and including a first region to which information corresponding to said first segment is permanently assigned and a second region to which said pages of said second and third segments can be selectively stored, an address in said first region being specified by a real address equivalent to a virtual address having a segment number of zero;
   a first page table provided for said second segments, and stored in said second region of said real storage and in $2^M$ pages of that of said third segments whose segment number differs from said segment number of said second segment by one in a predetermined direction, said first page table having a number of entries equal to the number of said pages of said second segment and in each of which a first page frame number is set to specify that of said page frames of said real storage to which the page specified by said page number of a virtual address is assigned;
   a second page table provided for said first page table and having a number of entries equal to the number of said pages that said first page table occupies and in each of which a second page frame number is set to specify one of those of said page frames of said real storage in which said first page table is stored, said second page table being stored in said first segment of said virtual storage and said first region of said real storage;
   a segment table stored in said first segment of said virtual storage and said first region of said real storage and having a plurality of entries, one of which is designated by said segment number of a virtual address, and in each of which translation type data is set to specify one of address translation types including a two-level paging address translation, and including origin data for specifying an origin of said second page table being set in that of said entries of said segment table whose translation type data specifies said two-level paging address translation; and
   a memory control unit having:
   (a) register means for storing a virtual address;
   (b) segment discriminating means, responsive to said virtual address stored in said register means, for determining whether said segment number of said virtual address specifies one of: (a) said first segment, (b) one of said second segments and (c) one of said third segments;
   (c) first address translating means, responsive to said segment discriminating means and said virtual address stored in said register means, for treating said virtual address as a real address when said segment number is determined by said segment discriminating means to specify said first segment; and
   (d) second address translating means, responsive to said segment discriminating means and said virtual address stored in said register means, for: (1) when said segment number is determined by said segment discriminating means to specify one of said second segments, referring to that of said entries of said segment table which is specified by said segment number of said virtual address, (2) when said translation type data set in said referred entry of said segment table specifies said two-level paging address translation, referring to that of said entries of said second page table which is specified by first real address data, obtained by concatenating said origin data set in said referred entry of said segment table and upper M bits of said page number of said virtual address, to thereby provide said second page frame number, (3) referring that of said entries of said first page table which is specified by second real address data, obtained by concatenating said second page frame number and the remaining bits of said page number of said virtual address, to thereby provide said first page frame number, and (4) concatenating said first page frame number and said displacement data of said virtual address to provide a real address.

2. A system according to claim 1, wherein a virtual address segment number corresponding to a virtual address which corresponds to said first real address data and said segment number of said virtual address stored in said register means differ by one, and said virtual address segment number has a page number equal to that which said upper M bits of said page number of said virtual address stored in said register means indicate, and has displacement data equal to concatenation data obtained by concatenating the remaining bits of said page number of said virtual address in said register means and N-bit data of zero, provided that each entry of said first page table consists of $2^N$ bytes.

3. A system according to claim 2, wherein said memory control unit further comprises third address translating means which is responsive to said segment discriminating means and said virtual address stored in said register means, for, when said segment number of said virtual address is determined to specify one of said third segments by said segment discriminating means, (1) changing said segment number of said virtual address by one in a direction opposite to said predetermined direction, (2) referring those of said entries of said segment table which are specified by said changed segment number, (3) referring to, when said translation type data set in said entry of said segment table specifies said two-level paging address translation, that of said entries of said second page table which is specified by third real address data obtained by concatenating said origin data set in said entry of said segment table and lower M bits of said page number of said virtual address, to thereby provide said second page frame number and (4) concatenating said second page frame number and displacement data of said virtual address to thereby provide a real address.

4. A system according to claim 3, wherein said segment discriminating means is also for determining whether said segment number of said virtual address specifies said first segment depending on whether said segment number of said virtual address is zero, and when said segment number of said virtual address is not zero, said segment discriminating means is also for determining whether or not said segment number of said virtual address specifies one of said second segments or one of said third segments depending on whether said segment number of said virtual address is even or odd.

* * * * *